(12) United States Patent
Pekny et al.

(10) Patent No.: US 12,528,039 B2
(45) Date of Patent: Jan. 20, 2026

(54) FILTER APPARATUS, VEHICLE, USE AND METHOD

(71) Applicant: MANN+HUMMEL GmbH, Ludwigsburg (DE)

(72) Inventors: Peter Pekny, Neuenmarkt (DE); Junlin Wu, Shangai (CN)

(73) Assignee: MANN+HUMMEL GmbH, Ludwigsburg (DE)

( * ) Notice: Subject to any disclaimer, the term of this patent is extended or adjusted under 35 U.S.C. 154(b) by 580 days.

(21) Appl. No.: 17/961,912

(22) Filed: Oct. 7, 2022

(65) Prior Publication Data

US 2023/0112927 A1    Apr. 13, 2023

(30) Foreign Application Priority Data

Oct. 7, 2021    (DE) .......................... 102021125994.0

(51) Int. Cl.
*B01D 46/00*    (2022.01)
*B01D 46/42*    (2006.01)
(Continued)

(52) U.S. Cl.
CPC ..... *B01D 46/0009* (2013.01); *B01D 46/0005* (2013.01); *B01D 46/4227* (2013.01);
(Continued)

(58) Field of Classification Search
CPC ............ B01D 46/0009; B01D 46/0005; B01D 46/4227; B01D 46/521; B01D 2265/02;
(Continued)

(56) References Cited

U.S. PATENT DOCUMENTS 11,439,939 B2    9/2022  Schumacher
2002/0112458 A1*  8/2002  Schneider .............. B01D 46/88
                                                    55/506

FOREIGN PATENT DOCUMENTS

DE    102010044258 A1    5/2011
DE    102020110940 A1    10/2021
(Continued)

*Primary Examiner* — Jennifer Dieterle
*Assistant Examiner* — Qianping He

(57) ABSTRACT

Filter apparatus (6) in particular passenger compartment filter apparatus, for example for a motor vehicle (1), comprising a filter element (8) having a filter medium body (9) and a frame (10) surrounding the filter medium body (9), wherein the frame (10) features opposite lateral surfaces (11, 12), a plurality of engagement elements (22*a* to 22*d*), and a filter housing (7) featuring, on two opposing wall sections (24, 25), in each case two engagement counter elements (28*a* to 28*d*) in which in each case one of the plurality of engagement elements (22*a* to 22*d*) can be accommodated in a positive fitting manner, wherein the engagement counter elements (28*a* to 28*d*) in each case are designed as a groove in the respective wall section (24, 25) of the filter housing (7) and feature: an insertion section (31) which, when the filter element (8) is mounted in the filter housing (7), permits an insertion movement of the respective engagement element (22*a* to 22*d*) substantially along the throughflow direction (L), and a locking section (32) connected to the insertion section (31) and angled with respect to the insertion section (31), wherein a respective engagement element (22*a* to 22*d*) is disposed on a respective lateral surface (11, 12) of the filter element (8) when the filter element (8) is mounted in the filter housing (7), extends away from the filter medium body (9), and is held in a respective locking section (32).

18 Claims, 9 Drawing Sheets

(51) Int. Cl.
  *B01D 46/52*    (2006.01)
  *B60H 3/06*     (2006.01)
(52) U.S. Cl.
  CPC ......... *B01D 46/521* (2013.01); *B60H 3/0608* (2013.01); *B60H 3/0616* (2013.01); *B01D 2265/02* (2013.01); *B01D 2265/024* (2013.01); *B01D 2265/028* (2013.01); *B01D 2265/04* (2013.01); *B01D 2275/205* (2013.01); *B60H 2003/065* (2013.01)
(58) Field of Classification Search
  CPC ........ B01D 2265/024; B01D 2265/028; B01D 2265/04; B01D 2275/205; B01D 2265/025; B01D 2265/021; B01D 46/0002; B60H 3/0608; B60H 3/0616; B60H 2003/065; B60H 1/00521
  USPC ....................................................... 55/385.3
  See application file for complete search history.

(56) References Cited

FOREIGN PATENT DOCUMENTS

| | | |
|---|---|---|
| DE | 102020110996 A1 | 10/2021 |
| DE | 102020123461 A1 | 3/2022 |

\* cited by examiner

Fig. 9B

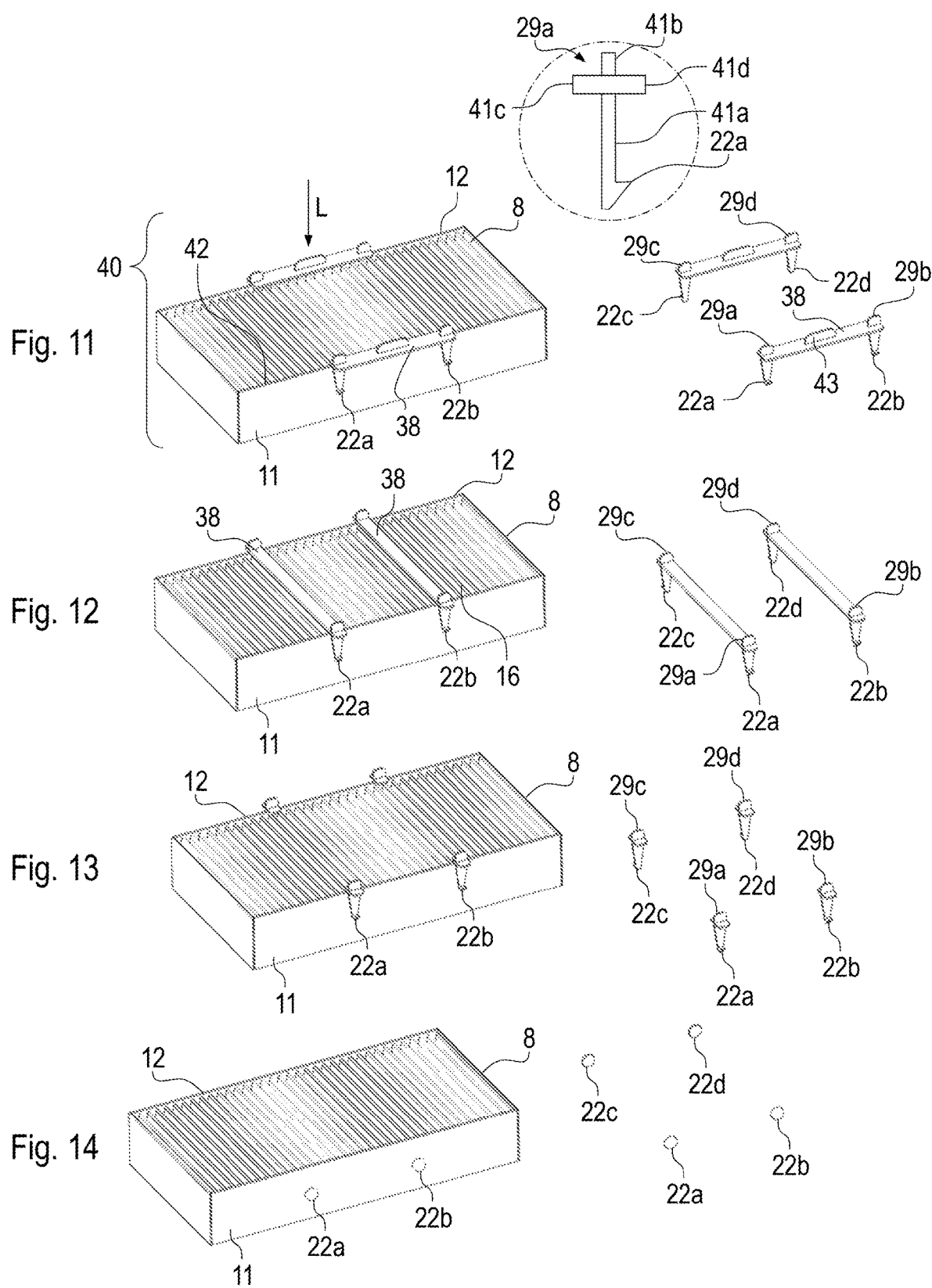

FILTER APPARATUS, VEHICLE, USE AND METHOD

TECHNICAL FIELD

The present invention relates to a filter apparatus, in particular to a passenger compartment filter apparatus, for example for a motor vehicle. Furthermore, the present invention relates to a vehicle having such a filter apparatus. Still further, the present invention relates to a use of a set comprising a filter element and a plurality of engagement elements in the aforementioned filter apparatus. According to a still further aspect, the present invention relates to a method for mounting a filter element in a filter housing using a plurality of engagement elements.

Although applicable to any filter apparatus, the present invention and the problem underlying it are described below for a passenger compartment filter of a motor vehicle.

Increasing air pollution, especially in large cities, combined with the use of modern airconditioning systems, makes it necessary to clean the air coming from outside into the passenger compartment of a motor vehicle and processed or air-conditioned using suitable filters. For example, particulate filters, odor filters or combinations thereof can be considered, which filter out or adsorb airborne particulates, particles and odors contained in the ambient air.

Folded or pleated filter material, such as filter fleece forming a pleated pack, are frequently used for filtering air for the passenger compartment of a motor vehicle. For this purpose, an initially flat filter material sheet is zigzag-folded. For example, the pleated pack is held by sidebands and headbands or some other frame. Such filter elements may be replaceably fixed in a filter housing. The filter apparatus thus formed may be installed in an air-conditioning system of a corresponding motor vehicle.

Replacing the filter elements should be as simple as possible. Simultaneously, the filter element should be securely fixed in the corresponding filter housing. That is to say, the filter element cannot be moved out of its position in the filter housing by vibrations or pressure surges. A further objective may be that only certain filter elements suitable for the respective application can be inserted into the filter housing.

It is generally known to provide filter elements and filter housings with suitable engagement elements and engagement counter elements (or receiving means) to achieve these objectives. In the assembled state, these elements provide a positive engagement holding the respective filter element in the associated filter housing. Examples of such engagement elements and engagement counter elements can be screws with associated threads or clips with associated catches.

BACKGROUND ART

DE 10 2007 050 850 A1 describes a passenger compartment filter for a heating or airconditioning system of a motor vehicle.

DISCLOSURE OF THE INVENTION

According to a first aspect, a filter apparatus, in particular a passenger compartment filter apparatus, for example for a motor vehicle, is proposed. The filter apparatus comprises a filter element having a filter medium body and a frame surrounding the filter medium body, the frame featuring opposing lateral surfaces. Furthermore, the filter apparatus comprises a plurality of engagement elements. Furthermore, the filter apparatus comprises a filter housing featuring two engagement counter elements on each of two opposing wall sections. In each of the engagement counter elements, one of the plurality of engagement elements is positively receivable. The engagement counter elements are each designed as a groove in a wall section of the filter housing. The engagement counter elements feature: an insertion section which, when the filter element is mounted in the filter housing, permits an insertion movement of the respective engagement element substantially along the throughflow direction, and a locking section connected to the insertion section and angled with respect to the insertion section. Furthermore, in the filter apparatus, a respective engagement element is disposed on a respective lateral surface of the filter element when the filter element is mounted in the filter housing, extends away from the filter medium body, and is positively held on a respective locking section.

Advantageously, the locking section allows the filter element to be easily attached in the filter housing. In embodiments, the one or a plurality of engagement elements may be moved through a respective insertion section during assembly of the filter element in the filter housing. In other embodiments, the one or a plurality of engagement elements may also be positively attached to the locking section directly (without first being moved through the insertion section). In any case, the filter housing preferably always features the insertion section. This advantageously results in a wide range of assembly options.

The one or a plurality of engagement elements may be designed as, for example, tenons, projections, pins, piping, etc.

What is meant by the fact that the locking section and the insertion section are connected is that they are, in particular, different sections of a continuous groove. For example, an angle between the locking section and the insertion section may be between 3° and 90°, preferably between 7° and 90°, more preferably 90°.

For example, the filter housing may have the shape of a frame, in particular a rectangular frame. The wall sections may be subsections of opposing sides of the frame. For example, the filter housing may be made of plastic material. In particular, the filter housing is made as a plastic injection molded component. Additionally, or alternatively, the filter housing may also be partially or completely made of metal, in particular sheet metal.

The filter element comprises, for example, a filter medium (also referred to herein as "filter medium body") and one or a plurality of stabilizing elements, in particular sidebands and/or headbands (also referred to as frontbands), which stabilize the filter medium at least sectionwise in order to maintain its shape, in particular during filter operation. The stabilizing elements can in particular form a closed or open frame—also in one piece of material—which surrounds the filter medium.

The stabilizing elements can be connected to the filter medium at the edges by a material bond, in particular by adhesion. For this purpose, the stabilizing elements can be heated and the filter medium pressed into the heated material. As an alternative, the stabilizing elements may be injection-molded onto the filter medium. Furthermore, an adhesive may be used as a filler material. The stabilizing elements may themselves be made of the same material as the filter medium. For example, the stabilizing elements may be made of PET (polyethylene terephthalate), a glass fiber material, synthetic fiber material, or other plastic or plastic blend, or a non-woven fabric. In particular, the stabilizing elements may be manufactured as plastic injection molded component. The stabilizing elements may be rigid or flexible (in particular also fluffy).

The sidebands (also referred to herein as "lateral surfaces") of the frame may have a weight per unit area of, for example, 100 to 500 g/m², preferably 200 to 400 g/m². The weight per unit area is determined according to DIN RN 29073-1 (non-woven). The tensile strength of the sidebands or the lateral surfaces of the frame may be, for example, at least 100, preferably at least 200, still further preferably at least 500 N/50 mm in the machine direction (longitudinal direction). Transversely to the machine direction, the tensile strength may be at least 20, preferably at least 100, and still further preferably at least 250 N/50 mm. The tensile strengths are determined according to DIN EN 29073-3.

Preferably, a weight per unit area and/or a tensile strength (in the machine direction and/or transversely thereto) of the sidebands is a lower value than that of the headbands. In particular, the sidebands are more elastic than the headbands. That is to say, a lower force is required to bend the sidebands by a predefined extent than the headbands.

The filter medium may be folded or corrugated. For example, zigzag- or W-folds are known as folds. The filter medium can be embossed and then sharply folded at embossed edges to form fold edges. The starting material may be a flat material filter sheet, which is formed accordingly. The filter medium comprises a filter fleece. In particular, the filter medium may be produced in a spunbond or meltblown process. Furthermore, the filter medium may be felted or needled. The filter medium comprises synthetic fibers, for example, polyester, polyphenyl sulfide, or polytetrafluoroethylene. Furthermore, the filter medium may comprise natural fibers, such as cotton. During processing, the fibers can be oriented in, obliquely and/or transversely to the machine direction.

The filter medium can be single-layer or multi-layer. It may furthermore comprise an adsorbent, such as activated carbon. Furthermore, the filter medium may feature an antimicrobial and/or antiallergenic effect. For example, an antimicrobial agent may be zinc pyrithione or nanosilver, and an antiallergenic agent may be polyphenol.

A corresponding filter element is used for filtering fluids, i.e. gaseous and/or liquid media, for example air. In this context, a gaseous medium or air also includes gas- or air-solid mixtures and/or gas- or air-liquid mixtures. For example, an air-conditioning system may feature the filter element.

A filter medium, in particular an open filter medium, can be adapted to remove particles of the test dust A4 according to ISO 12103-1 from an air flow with a filtration velocity of 0.10 to 0.30 m/s, based on the filter media surface, at an air permeability of greater than 3000 l/m²s (determined according to ISO 9237 at 200 Pa). The filtration characteristics can be determined, for example, according to DIN 71460-1.

A filter medium, in particular a highly separating filter medium, can be adapted to remove particles of the test dust A2 according to ISO 12103-1 as well as NaCl aerosol particles according to DIN 71460-1 from an air flow with a filtration velocity of 0.10 to 0.30 m/s, based on the filter media surface, at an air permeability of greater than 600 l/m²s (determined according to ISO 9237 at 200 Pa). The filtration characteristics can be determined, for example, according to DIN 71460-1.

The filter element may include a seal that seals a raw side associated with the filter element from a clean side thereof. The seal may be constructionally identical to one or more stabilizing elements of the filter element. As an alternative, the seal may be designed as an additional component. For example, the seal may be attached to the filter medium, to the one or a plurality of stabilizing elements, to the filter element, or to the filter housing.

The filter element may be replaceably fixed in the filter housing.

The filter apparatus can be used in passenger cars, trucks, construction machines, watercrafts, rail vehicles, aircraft and generally in HVAC technology, in particular in heating/air-conditioning units, in household appliances, in fuel cells or in building services engineering. These motorcars or vehicles can be operated electrically and/or using fuel (in particular gasoline or diesel). With regard to building services engineering, stationary facilities for treating air in particular come into consideration.

According to one embodiment, the two engagement elements are designed in opposite directions.

This means, for example, that the two engagement elements have corresponding members which either extend more or less towards each other, or extend more or less away from each other. For example, the locking sections of the two engagement counter-elements may extend towards or away from each other.

According to a further embodiment, the two engagement counter elements each have an L-shaped geometry. Preferably, the L-shaped geometries are arranged mirror-symmetrically to each other.

A corresponding symmetry axis can, for example, extend in the direction of the throughflow direction and divide an associated lateral surface into two equal surfaces.

According to another embodiment, one leg of the L-shape corresponds to the insertion section and the other leg of the L-shape corresponds to the locking section.

One leg may terminate at an edge of the corresponding lateral surface corresponding, for example, to the raw or clean side of the filter element. The other leg may extend, for example, parallel to the edge of the lateral surface. The legs of the L-shape may be of equal or different lengths. Instead of the L-shape, any other angular geometry could be provided.

According to a further embodiment, the two locking sections of the two engagement counter elements face away from each other. Preferably, the two insertion sections are arranged parallel to each other.

According to a further embodiment, a distance between the engagement elements is greater in an undeformed state of the filter element than a distance between the two insertion sections of a wall section of the filter housing, so that preferably the engagement elements snap into the locking sections at the end of the insertion movement.

According to this embodiment, the engagement elements are first brought closer to each other (by deforming the filter element) in order to be able to be inserted into the respective insertion section. For example, a filter element featuring two engagement elements on its lateral surfaces can simply be positively attached in the two engagement counter elements. This is realized by bending the filter element about an axis perpendicular to said lateral surfaces. As a result, the distance between the engagement elements is reduced. They can thus be easily inserted into the respective insertion section. As soon as the engagement elements reach the respective locking section, the filter element is released again, so that it adopts its undeformed initial position. In doing so, the engagement elements move along their respective locking section. The engagement elements then come to rest at the end of a respective locking section (end of the other leg). Thus, there is a positive engagement between the filter element and the filter housing via the engagement elements. This positive engagement can be released by deforming the filter element again. This deformation is counteracted by the rigidity of the frame (in particular the rigidity of its lateral surfaces). In general, it can be said that the filter element is snap-connected to the filter housing using the plurality of engagement elements, the snap-fit connection being secured by the rigidity of the frame or the lateral surfaces.

According to a further embodiment, the one or the plurality of engagement elements are designed as separate parts.

This means that the one or the plurality of engagement elements are neither connected to the filter element nor to the filter housing in the non-assembled state of the filter apparatus. In particular, the one or the plurality of engagement elements are not made in one piece or integrally formed with the filter element or the filter housing. This makes them easier to manufacture.

According to a further embodiment, the one or the plurality of engagement elements are releasably attachable to the filter element and/or to the filter housing.

Releasable fastening is used when installing the filter element in the filter housing. In particular, the one or the plurality of engagement elements connect the filter element and the filter housing to each other using a positive engagement.

According to a further embodiment, the one or the plurality of fastening elements are attached to the filter element, in particular glued or welded thereto, or formed integrally therewith.

This may simplify the assembly of the filter apparatus. In particular, the step of attaching the one or the plurality of engagement elements to the filter element may be eliminated.

According to a further embodiment, the respective locking section features a pocket or through opening in the wall section. Preferably, the respective engagement element engages positively in the pocket or the through-opening in the assembled state and is in particular snapped therein.

This allows the engagement element to be easily connected to the associated locking section.

According to a further embodiment, the lateral surfaces of the frame of the filter element each feature two through openings. The through openings preferably face a respective locking section when the filter element is mounted in the filter housing. In the assembly condition, a respective engagement element preferably passes through one of the two through openings and further preferably engages positively in the respective locking section.

In this case, an engagement element in the shape of a tenon is particularly suitable. The engagement element couples the frame of the filter element to the filter housing in a simple manner.

According to a further embodiment, the filter apparatus comprises holding sections connected to a respective engagement element and disposed in a recessed area of the filter medium body in assembly condition. Preferably, the recessed area of the filter medium body is accessible from the side from which the filter element is mounted in the filter housing.

For example, the recessed area in the filter medium body is provided by designing it as a pleated filter bellows. The recessed area may be an area between two folds. Preferably, the recessed area is designed by a sectionwise enlarged fold pitch. That is to say, the distance between two adjacent folds or fold edges is greater than between two or more other folds or fold edges of the filter medium body. As a result, the respective engagement element can be accommodated in a space-saving manner. The holding section may feature a gripping section for manually mounting the engagement element to the filter element and/or in the filter housing. As a result, the engagement elements can be handled more easily.

According to a further embodiment, the filter apparatus features holding sections which are connected to a respective engagement element and, in the assembled state, at least partially engage around or behind the filter element. In particular, the holding sections engage around or behind the filter element on its inflow and/or outflow side and/or on an upstream and/or downstream edge of the frame of the filter element.

As a result, the engagement elements easily hold the filter element.

According to a further embodiment, the respective holding sections are cross-shaped. Preferably, the respective engagement element is arranged at the lower end of the cross shape. Preferably, the cross shape laterally engages behind the filter element, in particular on the upstream and/or downstream edge of the frame of the filter element, and/or on the wall of the filter housing. Preferably, an upper end of the cross shape features a gripping section for manually mounting the engagement element to the filter element and/or in the filter housing.

The cross shape is preferably composed of four webs arranged at right angles to each other. The webs are connected to each other via the same attachment point, the attachment point being provided at a respective end of the four webs. The webs may be of equal or different lengths. In particular, a lower section may be longer than an upper section. The two lateral sections may be shorter than the lower long section. Preferably, the upper section corresponds to the gripping section. Instead of being cross-shaped, the holding sections could also be T-shaped. The respective engagement element may be disposed at the lower end of the vertical web of the T-shape. The horizontal web of the T-shape may engage behind the filter element, in particular at the upstream and/or downstream edge of the frame of the filter element, and/or the wall of the filter housing. In other words, this embodiment lacks, for example, the gripping section.

According to a further embodiment, two of the plurality of engagement elements or two of the holding sections are connected using a connector.

This allows the engagement elements to secure each other in their mounting position. Furthermore, the engagement elements can be handled more easily.

According to a further embodiment, the connector extends parallel or perpendicular to the lateral surfaces of the frame in the assembly condition.

This allows either engagement elements disposed on the same side of the filter element to be connected to one another (connector extends parallel) or engagement elements disposed on opposing sides of the filter element to be connected to one another (connector extends perpendicular).

According to a further embodiment, two of the plurality of engagement elements each disposed on opposing lateral surfaces of the frame or on the same lateral surface of the frame are connected to each other using the connector.

According to a further embodiment, the connector is elastically deformable for inserting the engagement elements into the respective locking section.

In particular, the connector (due to its elasticity or rigidity) can thus secure the position of the engagement elements in their respective locking section so that they do not unintentionally disengage therefrom.

According to a further embodiment, the connector extends across fold tips of the filter medium body and/or in a recessed area through the filter medium body.

As a result, the connector can be conveniently located.

According to a second aspect, a vehicle having the foregoing filter apparatus is provided. According to a third aspect, the use of a set comprising a filter element and a plurality of engagement elements in a filter apparatus as described above is proposed. The filter element comprises a filter medium body and a frame surrounding the filter medium body. The frame features opposing lateral surfaces. A respective engagement element is adapted to be arranged on a respective lateral surface of the filter element in assembly condition of the filter element in the filter housing, to extend away from the filter medium body, and to be positively held in a respective locking section of the filter housing.

Such a set is well suited for replacing a possibly used filter element at the filter apparatus. Alternatively, such a set can also be used as part of the original equipment of a filter apparatus, as described above, with a corresponding filter element. With the aid of the engagement elements, the filter element can be positively connected to the filter housing in a simple manner using the locking section.

According to one embodiment, the respective engagement element is adapted to be inserted along a respective insertion section of the filter housing substantially along the throughflow direction when the filter element is mounted in the filter housing.

Accordingly, the insertion section that may be present in the filter housing may be used while replacing the filter element that may have been used up or while re-equipping the filter apparatus with a filter element, but it is not necessary to do so. For example, in embodiments, the engagement elements may also be directly attached to the locking section, as already explained above.

According to a fourth aspect, a method of mounting a filter element in a filter housing using a plurality of engagement elements is proposed. The filter element comprises a filter medium body and a frame surrounding the filter medium body. The frame features opposing lateral surfaces. The filter housing features two engagement counter elements on each of two opposing wall sections. In each of the engagement counter elements, one of the plurality of engagement elements is positively receivable. The engagement counter elements are each designed as a groove in a wall section of the filter housing and feature: an insertion section which, when the filter element is mounted in the filter housing, permits an insertion movement of the respective engagement element substantially along the throughflow direction, and a locking section connected to the insertion section and angled with respect to the insertion section, the method featuring:
  a) inserting the filter element into the filter housing, and
  b) arranging a respective engagement element on a respective lateral surface of the filter element such that it extends away from the filter medium body and is positively held in a respective locking section.

According to one embodiment, and before executing step b), the respective engagement element is inserted along a respective insertion section of the filter housing substantially along the throughflow direction.

That is, although the filter housing features the insertion section, it need not be used to secure the engagement element in its locking section during the assembly process.

The features and advantages described for the first aspect apply accordingly to the other aspects described above, and vice versa.

Further possible implementations of the invention comprise also not explicitly mentioned combinations of characteristics or process steps described previously or in the following with respect to the embodiment examples. In this context, the person of skill in the art will add also individual aspects as improvements or complements to the respective basic form of the invention.

Further embodiments of the invention are subject of the subclaims as well as of the embodiment examples of the invention described in the following. Furthermore, the invention is explained in detail based on embodiment examples with reference to the attached figures.

DESCRIPTION OF DRAWINGS

Shown is in:
FIG. 9B: a section I-I from FIG. 9A;
FIG. 11 to FIG. 15: different embodiments of filter elements together with associated engagement elements.

In the figures, the same reference numerals denote identical or analog components, unless otherwise stated.

MODE(S) FOR INVENTION

Figure 1:
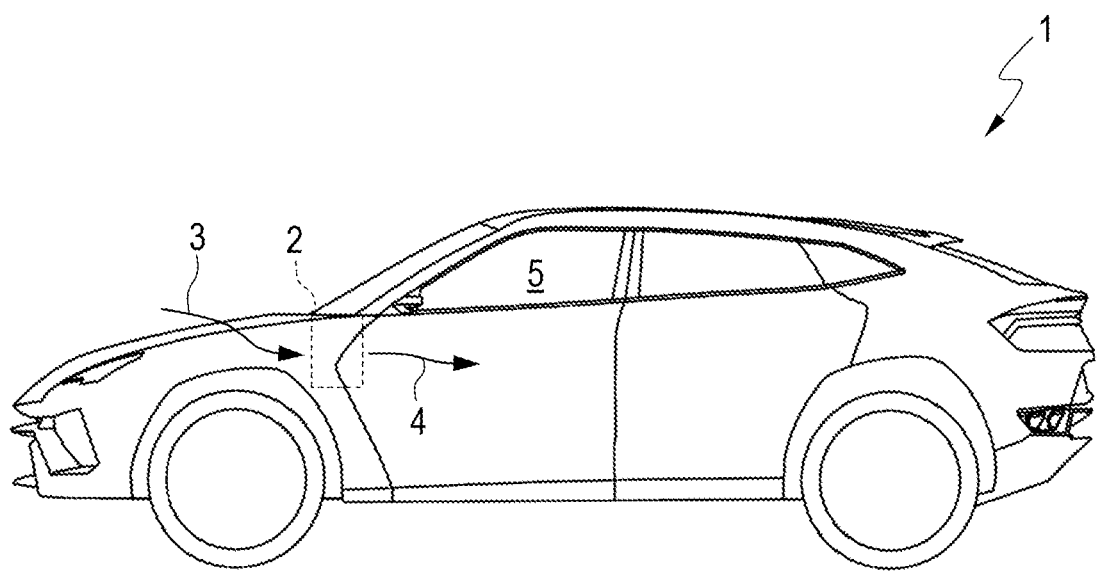
FIG. 1: a schematic diagram of a motor vehicle with a filter apparatus.

FIG. 1 shows a motor vehicle 1 with an air-conditioning system 2, which may be designed as a heating air conditioning system. The air-conditioning system 2 takes in outdoor air 3 and supplies filtered air 4 to a passenger compartment 5 of the motor vehicle 1. For this purpose, the air-conditioning system 2 comprises a filter apparatus 6 shown in FIG. 2.

The filter apparatus 6 comprises a filter housing 7 with a passenger compartment filter 8 (also referred to herein as "filter element") accommodated therein, in particular in a replaceable manner. The passenger compartment filter 8 is shown in more detail in FIG. 3.

Figure 3:
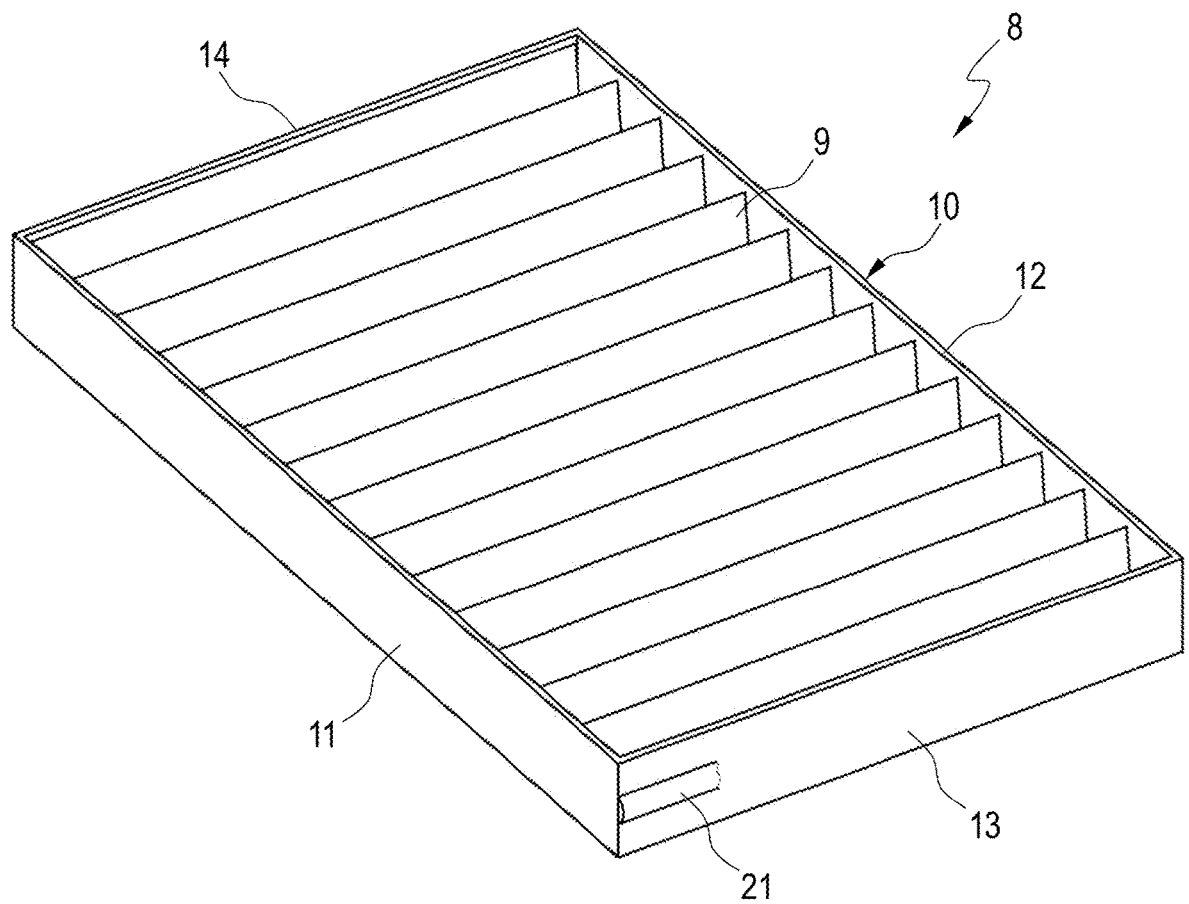
FIG. 3: a perspective representation of the passenger compartment filter of FIG. 2 comprising a frame and a filter medium.

The passenger compartment filter 8 has a filter medium 9 (also referred to herein as "filter medium body"), which is connected in particular all around to a frame 10 (FIG. 3). The frame 10 may comprise, for example, sidebands 11, 12 and headbands 13, 14.

Figure 4:
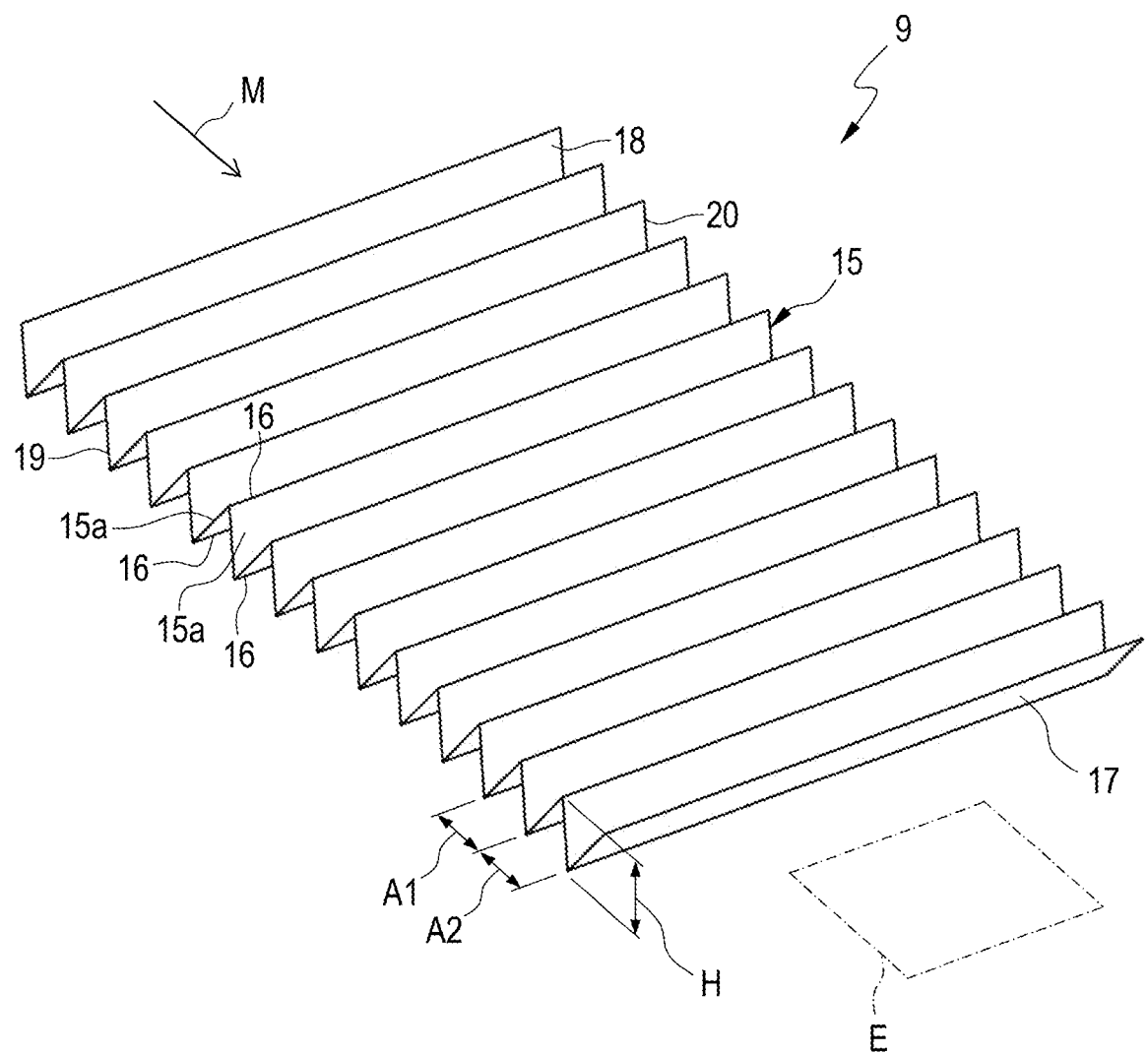
FIG. 4: a perspective representation of the filter medium from FIG. 3.

The filter medium 9 is shown isolated in FIG. 4. The filter medium 9 is, for example, a filter fleece, filter fabric, filter scrim or filter felt, in particular a needle felt. In particular, the filter medium 9 may be produced by a meltblown process. The filter medium 9 may feature natural fibers, such as cotton, or synthetic fibers, for example made of polyester, polyphenyl sulfide or polytetrafluoroethylene. During processing, the fibers can be oriented in, obliquely and/or transversely to the machine direction M. Also, the fibers may be stretched in a spatial direction. The filter medium 9 may be designed in a single layer or in multiple layers.

The filter medium 9 may feature folds 15, which typically extend transverse to the machine direction M. The folded filter medium 9 is also referred to as pleats. The folds 15 may be created by folding along sharp fold edges 16 (also referred to as "fold tips"), or by a corrugated design of the filter medium 9. A respective fold 15 may be defined by two fold sections 15a, which are connected to one another by a corresponding fold edge 16. According to the embodiment example, the fold edges 16 point in or against the inflow direction or throughflow direction, which is indicated by the arrow L in FIG. 2. The folding can in particular be designed as a zig-zag folding.

A folding in which the folds 15 feature a varying height H is also possible. Furthermore, the fold distance between the folds 15 may vary so that the distance A1 is not equal to the distance A2. The filter medium 9 may be self-supporting, i.e. the folds 15 are dimensionally stable when flowing through them as intended during filter operation.

In machine direction M, the filter medium 9 is limited by end folds 17, 18. Transversely thereto, the filter medium 9 is limited by fold front edges 19, 20 (also referred to as folding profiles). By "fold front edge" is meant the end face side of the fold surface which extends between adjacent fold edges 16 of a respective fold 15.

The filter medium 9 may feature a rectangular shape in top view, i.e. in the plane E of its planar extension. However, a triangular, pentagonal or polygonal, round or oval shape is also conceivable.

The sidebands 11, 12 shown in FIG. 3 are connected to the fold front edges 19, 20, and the headbands 13, 14 are connected to the end folds 17, 18, in particular by fusing, welding or gluing. The sidebands 11, 12 as well as the headbands 13, 14 may form the frame 10 in one piece or in several pieces. The sidebands 11, 12 as well as the headbands 13, 14 can, for example, be made of an in particular flexible fiber material or as in particular rigid plastic injection molded components. In particular, the frame 10 may be produced by injection molding onto the filter medium 9.

The filter medium 9 may act as a particulate filter, filtering particles, in particular dust, airborne particulates or liquid droplets, from the intake air 3. In addition, the filter medium 9 may act as an odor filter. For this purpose, it may for example feature a layer of activated carbon. The filter medium 9 may be adapted in general to absorb or adsorb certain solid, liquid and/or gaseous substances.

Figure 2:
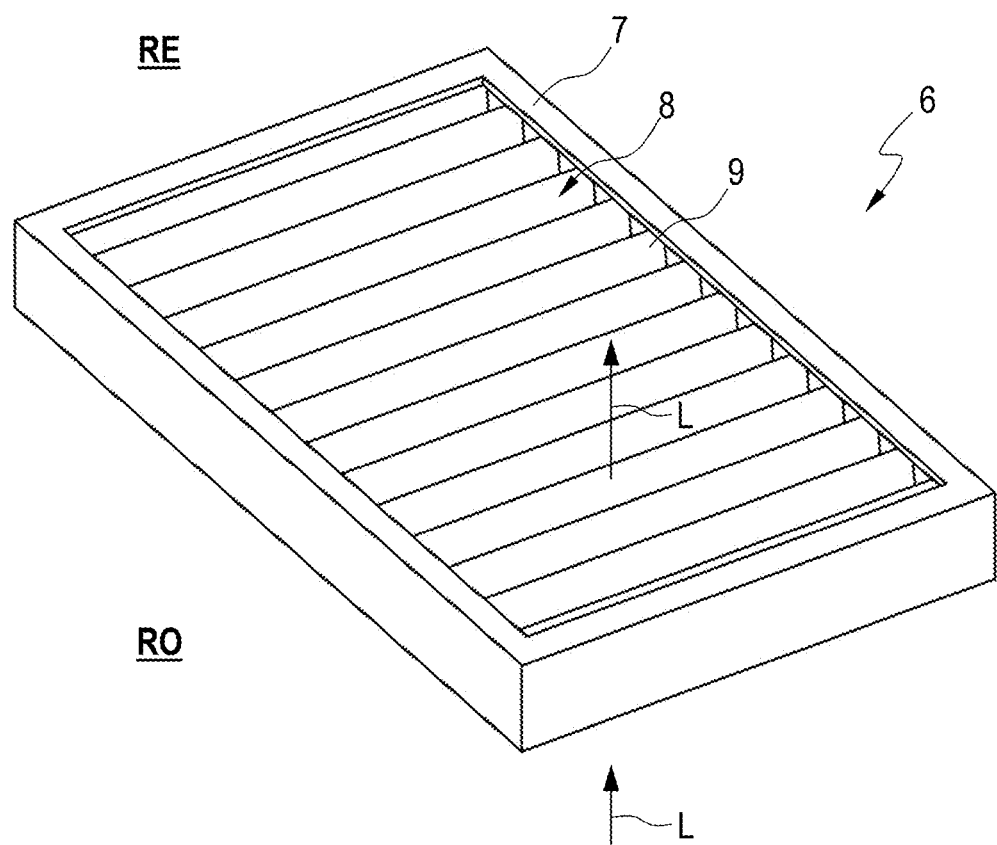
FIG. 2: a perspective representation of the filter apparatus of FIG. 1 comprising a filter housing with a passenger compartment filter received therein.

During filter operation, air L flows through the filter medium 9 perpendicular to its flat extension, as shown in FIG. 2. The air L flows from a raw side RO of the passenger compartment filter 8 to a clean side RE thereof.

In order to ensure a sufficient seal between the raw and clean sides RO, RE, a seal may be provided between the passenger compartment filter 9 and the filter housing 7. For example, the seal may be integrated into the frame 10. In this case, the frame 10 is at least partially formed of a sealing material. As an alternative, the seal may be provided as an additional part, for example attached to the frame 10, in particular injection-molded thereon. Such a seal 21 is shown in an exemplary fashion and in detail in FIG. 3.

Figure 5C:
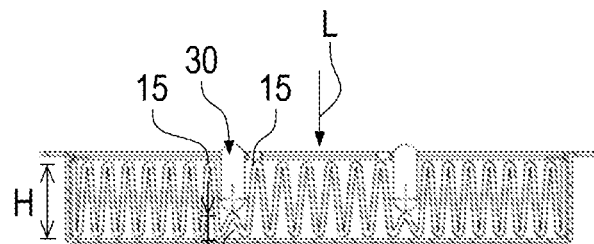
FIG. 5C: a section II-II from FIG. 5A.
Figure 5B:
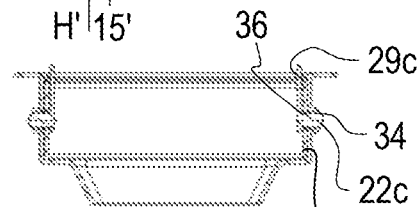
FIG. 5B: a section I-I from FIG. 5A.
Figure 5A:
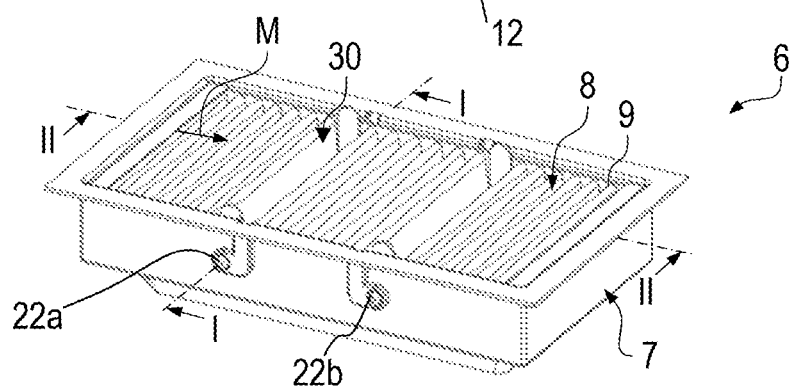
FIG. 5A: in a perspective view of a filter apparatus according to a first embodiment.
Figure 6:
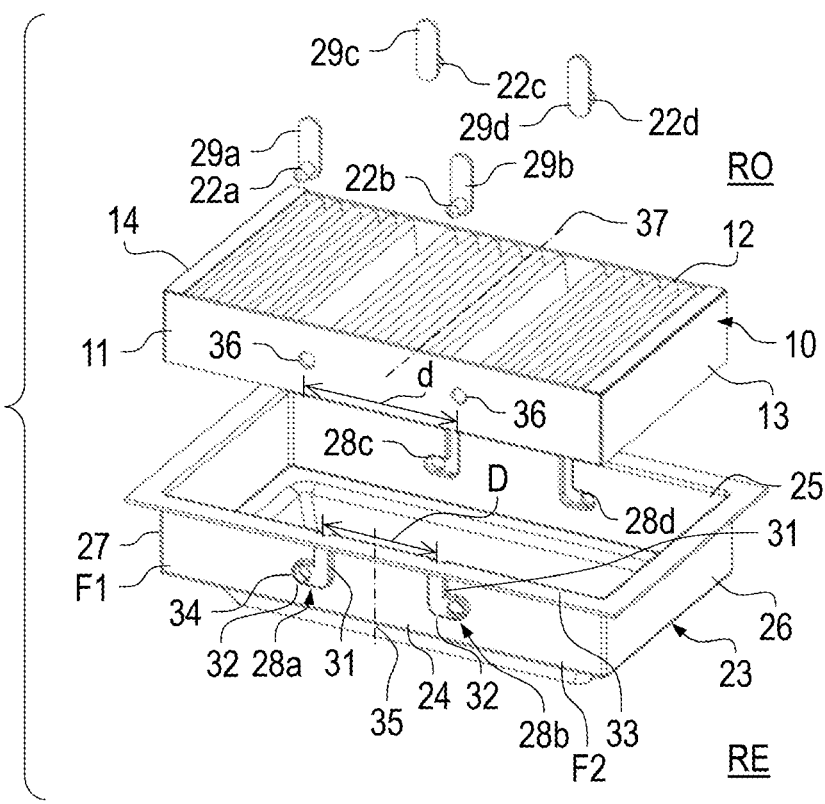
FIG. 6: an exploded view of the filter apparatus according to FIGS. 5A to 5C.

FIG. 5A shows in a perspective view a filter apparatus 6 according to a first embodiment. FIG. 5B shows a section I-I, FIG. 5C shows a section II-II from FIG. 5A. FIG. 6 shows an exploded view of the first embodiment. In the following, reference is made collectively to FIGS. 5A to 6.

The filter apparatus 6 comprises a filter housing 7 (FIG. 5A) with a filter element 8 received therein. The filter element 8 is held in the mounting position shown using a plurality of engagement elements 22a to 22d (FIG. 6).

A filter medium or filter medium body is designated in the figures by 9. It is enclosed by a circumferential frame 10. It is composed of sidebands 11, 12 (also referred to as "lateral surfaces") and headbands 13, 14.

For example, the filter housing 7 also comprises a frame 23 which is composed, for example, of respective opposing wall sections 24, 25 (FIG. 6) and 26, 27. In this case, the wall sections 24, 25 are opposite the sidebands 11, 12, and the wall sections 26, 27 are opposite the headbands 13, 14. The filter housing 7 may also feature a different shape.

According to the embodiment example, the wall sections 24, 25 are each designed with two engagement counter elements 28a to 28d (FIG. 6). One of the engagement elements 22a to 22d can be positively accommodated therein in each case. For example, the engagement counter elements 28a to 28d are each designed as a groove. In this case, the engagement counter elements 28a, 28b are provided in the wall section 24, the engagement counter elements 28c, 28d in the wall section 25. The filter housing 7 together with the engagement counter elements 28a to 28d can, for example, be made of plastic, in particular by injection molding.

The engagement elements 22a to 22d may be designed as, for example, tenons. In particular, as shown in FIGS. 5A to 6, they may be provided at one end of a holding section 29a to 29d or formed integrally therewith. The holding sections 29a to 29d may be made in the form of tabs. These tabs may provide a grip section for gripping the engagement elements 22a to 22d during assembly of the filter apparatus 6, which is easy to grip with the hand. For example, in the assembled state, the holding sections 29a to 29d could be at least partially (or completely) disposed in recessed areas 30. As can be seen in FIG. 5C, such recessed areas 30 can be formed by forming a fold 15' of the filter medium body 9 with a lower height H' than the folds 15 adjacent to both sides of the fold 15', each formed with a height H.

The engagement counter elements 28a to 28d may be configured in detail as follows. Each of the engagement counter elements 28a to 28d comprises—as explained below in an exemplary fashion for the engagement counter element 28a (FIG. 6)—an insertion section 31 and a locking section 32. The sections 31, 32 are preferably part of the same continuous groove. The insertion section 31 preferably extends in the throughflow direction L (see FIG. 5C). It leads from an upstream edge 33 of the wall section 24, for example, towards a center thereof. At that point, the insertion section 31 adjoins the locking section 31 at an angle for example of 90°. This results in an L-shape. A through hole 34 may be provided towards the end of the locking section 32. This completely penetrates the material of the wall section 24. Instead, only one pocket could be provided, which is open (accessible) to the inside. The inflow side corresponds to the raw side RO of FIG. 2.

As can be seen in FIG. 6, the engagement elements 28a, 28b are designed in opposite directions. For example, the locking sections 32 extend in opposite directions. On the other hand, the insertion sections 31 are arranged parallel to each other. In particular, the engagement counter elements 28a, 28b may be designed mirror-symmetrically with respect to a symmetry axis 35. The symmetry axis 35 is aligned in the throughflow direction L and divides the wall section 24 into approximately equal areas F1, F2.

In the present case, the engagement elements 22a to 22d-together with their holding sections 29a to 29d—are designed as separate parts, i.e. in the non-assembled state (FIG. 6) they are connected neither to the filter housing 7 nor to the filter element 8. Rather, they are releasably connectable to the filter element 8 and the filter housing 9, thereby securing the filter element 8 in its mounting position in the filter housing 7, as explained in more detail below.

For example, two through holes 36 are formed in each of the sidebands 11, 12. Once the filter element 8 have been inserted into the filter housing 7, the through holes 36 respectively face the through holes 34 in the engagement counter elements 28a, 28b (step S1 of the method shown in FIG. 16).

In a further step, the engagement elements 22a to 22d are now moved into the recessed areas 30 and from there are pushed from the inside through the through holes 36 into the through holes 34. Accordingly, a respective engagement element 22a to 22d is then arranged on a respective lateral surface 11, 12 and extends away from the filter medium body 9. As a result of the fact that the engagement elements 22a to 22d each engage through both the through-hole 36 and the through-hole 34, a positive engagement is realized between them and the filter housing 7 or the filter element 8 (process step S2 in FIG. 6).

As an alternative, the engagement elements 22a to 22d can already be positioned in the respective through holes 36 before the filter element 9 is inserted into the filter housing 7. The filter element 8 is then bent—for example manually—about an axis 37. The axis 37 extends, for example, perpendicularly to the lateral surfaces 11, 12. Due to this deformation (not shown), the through holes 36 move closer together (not shown), which in the undeformed state feature a greater distance d from one another than the insertion sections 31. The distance between them is designated by D in FIG. 6. Accordingly, due to the deformation, the engagement elements 22a to 22d can then be inserted into the insertion sections 31 which open into the edge 33. The engagement elements 22a to 22d are then pushed along the respective insertion section 31 in the throughflow direction L—in FIG. 6 downwards—until they reach the respective locking section 32 connected to the insertion sections 31. This corresponds to process step S3 of FIG. 16.

The filter element 8 is then released allowing it to deform back to its initial state. In doing so, the engagement elements 22a to 22d each move outwardly along the locking sections 32 and finally engage positively in the through holes 34, for which purpose pressure is applied to the engagement elements 22a to 22d from the inside, for example manually.

Advantageously, the holding sections 29a to 29d are accessible from the assembly side from which the filter element 8 is inserted into the filter housing 7, which in the present case corresponds to the raw side RO, and can be easily moved inwardly manually for disassembly of the filter element 9 so that the engagement elements 22a to 22d disengage from the through holes 32, 36.

Figure 7C:
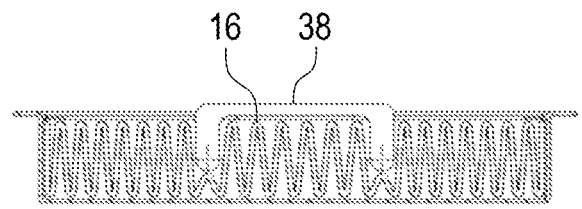
FIG. 7C: a section II-II from FIG. 7A.
Figure 7B:
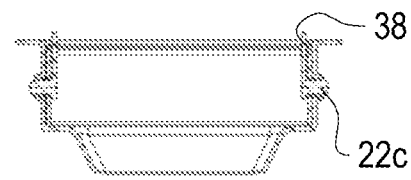
FIG. 7B: a section I-I from FIG. 7A.
Figure 7A:
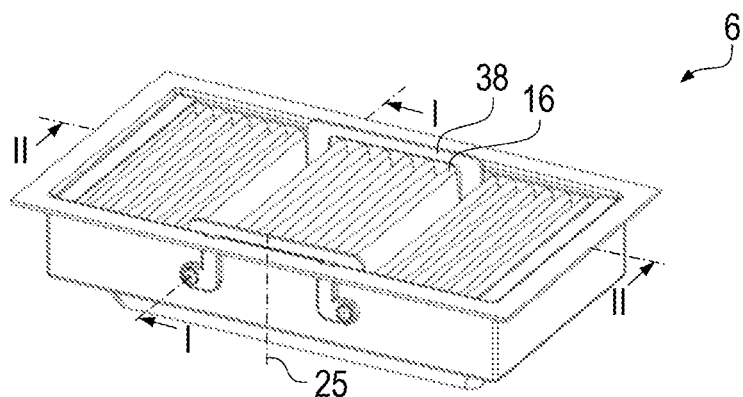
FIG. 7A: in a perspective view a filter apparatus according to a second embodiment.
Figure 8:
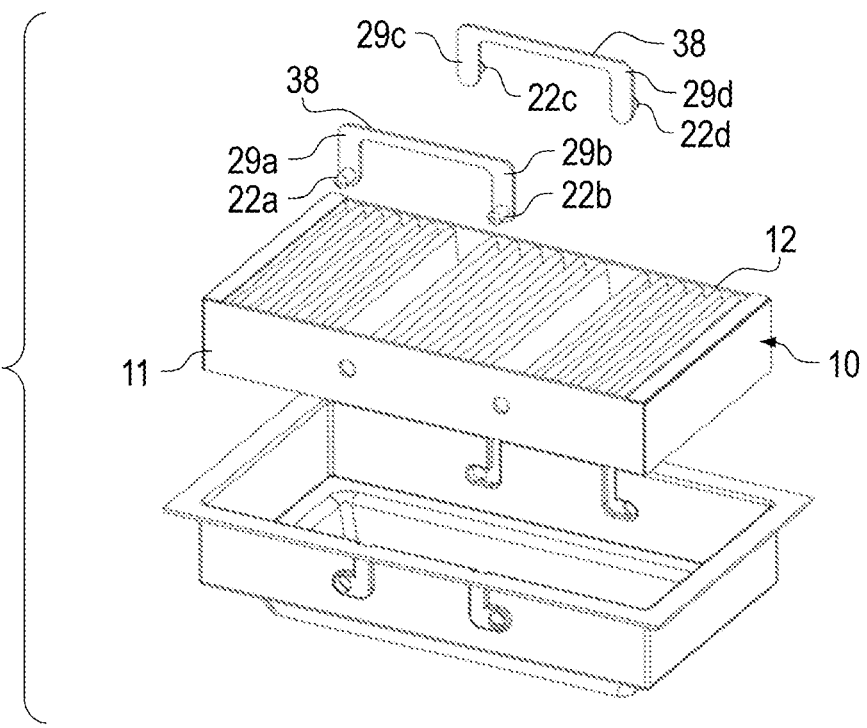
FIG. 8: an exploded view of the filter apparatus according to FIGS. 7A to 7C.

FIG. 7A shows a filter apparatus 6 according to a second embodiment in perspective view. FIG. 7B shows a section I-I, FIG. 7C shows a section II-II from FIG. 7A. FIG. 8 shows an exploded view of the second embodiment. Subsequent explanations refer to FIGS. 7A to 8 collectively, wherein focus is given to differences from the first embodiment according to FIGS. 5A to 6.

In the second embodiment, and in contrast to the first embodiment, the holding sections 29a, 29b or 29c, 29d of two respective engagement elements 22a, 22b or 22c, 22d, which are disposed on the same lateral surface 11 or 12, are connected to a respective connector 38. The connector 38 is disposed parallel to the lateral surface 11 in the assembled state, as can be seen in FIG. 7A. It also extends above fold tips or fold edges 16.

The connector 38 may be elastically designed. This is particularly the case for the assembly variant in which the engagement elements 22a, 22b or 22c, 22d are guided along the insertion sections 31 of the engagement counter elements 28a to 28d, since in this case the distance between the adjacent engagement elements 22a, 22b or 22c, 22d is reduced (cf. the explanations on the distances d and D in connection with FIG. 6 above). As soon as the engagement elements 22a to 22d reach their respective locking section 32 towards the end of the respective insertion section 31, they snap elastically outwards into the end of a respective insertion section 32. The positive engagement thus created is secured by the respective connector 38 due to its elasticity or rigidity.

Figure 9C:
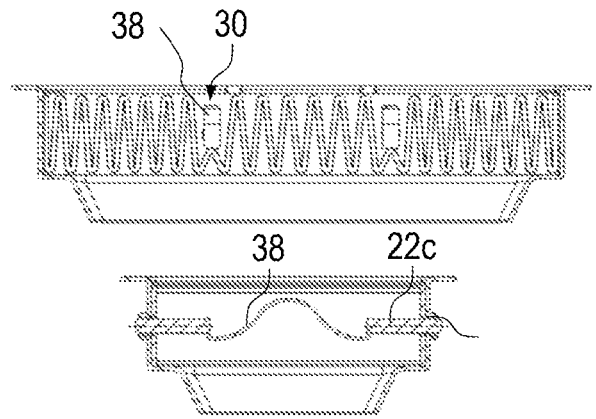
FIG. 9C: a section II-II from FIG. 9A.
Figure 9A:
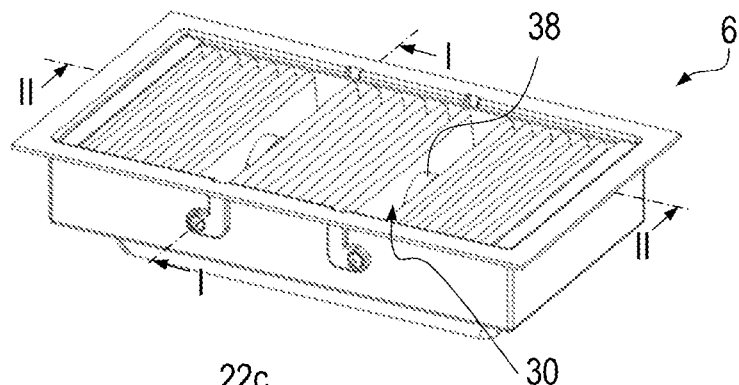
FIG. 9A: in a perspective view a filter apparatus according to a third embodiment.
Figure 10:
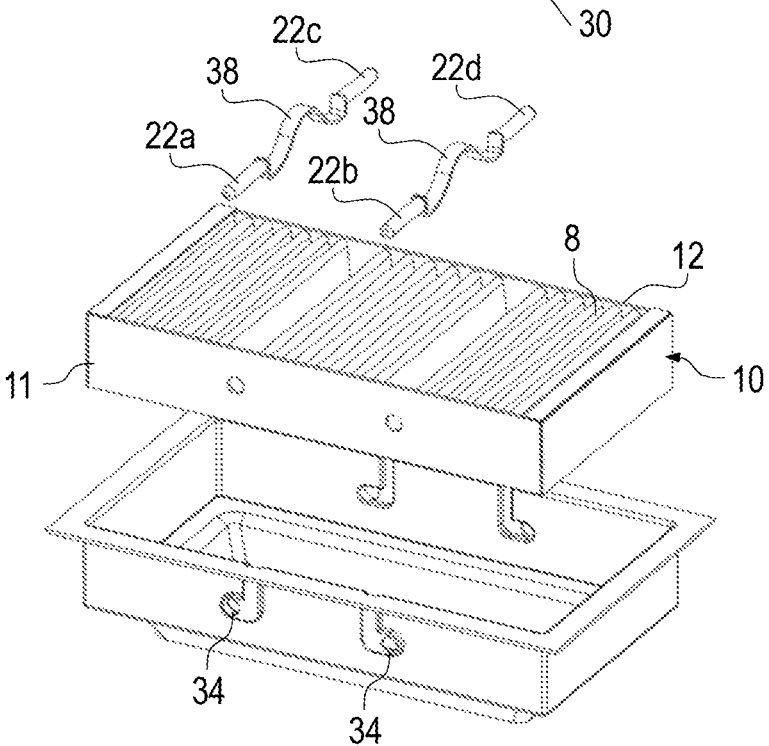
FIG. 10: in an exploded view the filter apparatus according to FIGS. 9A to 9C.

FIG. 9A shows a perspective view of a third embodiment of a filter apparatus 6. FIG. 9B shows a section I-I, FIG. 9C shows a section II-II from FIG. 9A. FIG. 10 illustrates an exploded view of the third embodiment. In the following, reference is made to FIGS. 9A to 10 collectively, wherein focus is given to explaining the differences with respect to the foregoing embodiments.

Unlike the second embodiment according to FIGS. 7A to 8, in the third embodiment according to FIGS. 9A to 10, the engagement elements 22a, 22c and 22b, 22d, which are disposed on different lateral surfaces 11, 12 of the frame 10, are connected to a respective connector 38. The connector 38 is preferably elastic and, where appropriate, additionally bent, so that it secures the engagement elements 22a to 22d in their respective engagement position with the through holes 34. For this purpose, in the assembled state, the connector 38 biases the engagement elements 22a, 22c or 22b, 22d located at its ends outwardly, that is in a direction away from the filter element 8. In this case, the connectors 38 are disposed in a direction perpendicular to the lateral surfaces 11, 12. Furthermore, the connectors 38 may extend partially or completely within the recessed areas 30 (see FIG. 9C).

FIG. 11 shows on the left side a filter element 8 with engagement elements 22a to 22d in a mounting position. The filter housing 7 is not shown for reasons of clarity. On the right side, the engagement elements 22a to 22d together with connectors 38 are shown isolated. In an enlarged view, a holding section 29a for the engagement element 22a is illustrated in more detail in an exemplary fashion.

According to the embodiment example, the engagement elements 22a to 22d have the shape of hooks. They are arranged to engage positively in the locking sections 32 of the engagement counter elements 28a to 28d shown, for example, in FIG. 6. This is done by pushing the engagement elements 22a to 22d substantially along the throughflow direction L into a gap (not shown) between the filter element 8 and the wall 24 or 25 (see FIG. 6). In doing so, the lateral surfaces 11, 12 are elastically pressed inwardly and then provide a contact pressure which holds the engagement elements 22a to 22d in engagement with the locking sections 32.

The holding section 29a (see the enlarged view in FIG. 11) is exemplarily designed in a cross shape and comprises four webs 41a to 41d. In this case, web 41a points downward in FIG. 11. The engagement element 22a is integrally molded to its lower end. The web 41b points vertically upwards. It is shorter than the web 41a and serves, for example, as a grip section for manual gripping when inserting the engagement elements 22a to 22d or when removing them as part of the assembly or disassembly of the filter element 8. The web 41c points laterally and is also shorter than the web 41a, for example. The web 41c engages behind an upper edge 42 of the lateral surface (or sideband) 11 with respect to the engagement element 22a. This prevents the filter element 8 from moving along the throughflow direction L with respect to the filter housing 7. The web 41d is also shorter than the web 41a and engages behind the edge 33 (see FIG. 6) of the filter housing 7. This further improves the fixation of the engagement elements 22a to 22d in the locking sections 32.

In the embodiment example according to FIG. 11, the webs 41a to 41d are an integral part of the connectors 38. Furthermore, the connectors 38 comprise, for example, a further grip section in the shape of a tab 43.

In the embodiment example according to FIG. 11, a respective connector 38 connects two holding sections 29a, 29b and 29c, 29d, respectively, and two engagement elements 22a, 22b and 22c, 22d, respectively, which are disposed on the same side of a respective lateral surface 11, 12. Accordingly, the connectors 38 extend parallel to the lateral surfaces 11, 12. Two engagement elements 22a, 22b and 22c, 22d respectively form a separate part with two holding sections 29a, 29b and 29c, 29d respectively and one connector 38.

In contrast, FIG. 12 shows an embodiment example in which the connectors 38 connect holding sections 29a, 29c and 29b, 29d, respectively, and engagement elements 22a, 22c and 22b, 22d, respectively, on opposite lateral surfaces 11, 12. Accordingly, the connectors 38 extend transversely to the lateral surfaces 11, 12. Furthermore, the connectors 38 extend above fold edges 16. Two engagement elements 22a, 22c and 22b, 22d respectively form a separate part with two holding sections 29a, 29c and 29b, 29d respectively and one connector 38. In the embodiment example according to FIG. 12, the filter element 8 is completely embraced by the holding sections 29a to 29d together with the connectors 38.

In the embodiment example according to FIG. 13, the engagement elements 22a to 22d together with respective associated holding sections 29a to 29d are each designed as a separate part and are not connected to one another using connectors 38. In each case, two of the engagement elements 22a to 22d together with associated holding sections 29a to 29d are disposed on a sideband 11 or 12.

Figure 16:
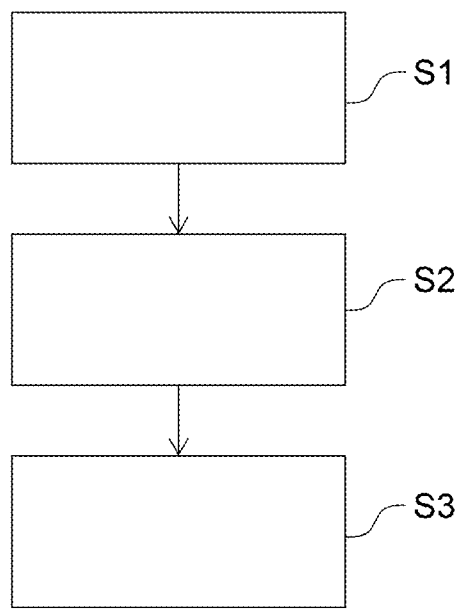
FIG. 16: a method according to one embodiment.

In the embodiment example according to FIG. 14, the engagement elements 22a to 22d are fixed to the filter element 8, even before the first assembly step (see step S1 according to FIG. 16). In particular, the engagement elements 22a, 22b or 22c, 22d are glued to, welded to or integrally formed with the sidebands 11 or 12. According to the embodiment example, the engagement elements are shaped as projections projecting outwardly from a respective sideband 11, 12, that is away from the filter element 8. The engagement elements 22a to 22d according to FIG. 14 are arranged, for example, to engage positively in the through holes 34 or corresponding pockets (see FIG. 6).

Figure 15:
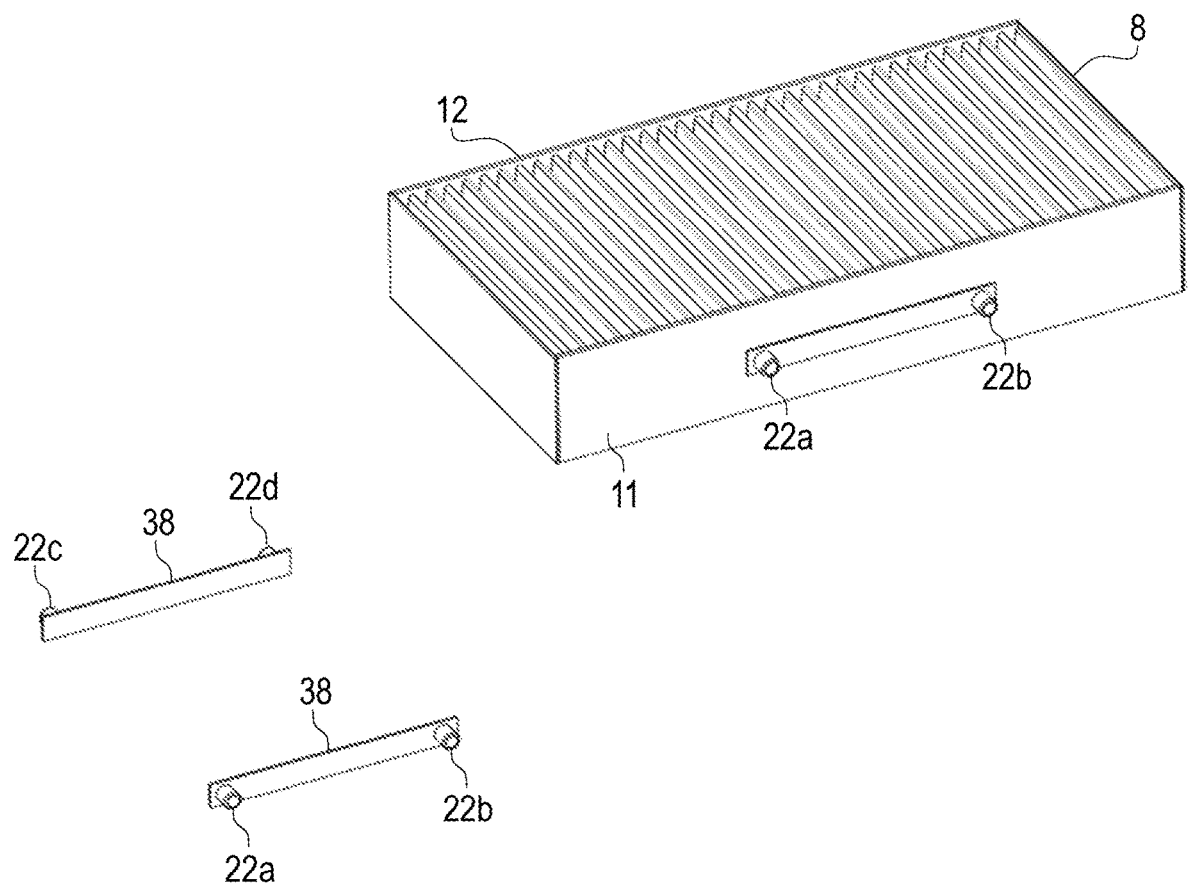

In the embodiment example according to FIG. 15, two respective engagement elements 22a, 22b or 22c and 22d are connected to one another using a connector 38, the connector 38 being fastened, in particular glued, to an associated side wall 11 or 12. In this case, the connector 38 can also be elastically designed in order to permit a change in the distance d (see FIG. 6).

In this case, FIGS. 11 to 15 each show a set 40 comprising a filter element 8 and engagement elements 22a to 22d. The set 40 is suitable for being used with a filter housing 7, such as shown in FIG. 6. A filter element already present there can be easily replaced using the set 40, preferably at least steps S1 and S2 being carried out in accordance with the method according to FIG. 16, optionally also step S3.

Although the present invention has been explained in more detail with reference to preferred examples of embodiments, it is not limited thereto, but can be modified in various ways. "One" does not exclude a plurality herein.

REFERENCE NUMBERS 1 motor vehicle
2 air-conditioning system
3 outdoor air
4 air
5 passenger compartment
6 filter apparatus
7 filter housing
8 passenger compartment filter/filter element
9 filter medium/filter medium body
10 frame
11 sideband/lateral surface
12 sideband/lateral surface
13 headband
14 headband
15 fold
15a fold section
16 fold edge
17 end fold
18 end fold
19 fold front edge
20 fold front edge
21 seal
22a to 22d engagement elements
23 frame
24 wall section
25 wall section
26 wall section
27 wall section
28a to 28d engagement elements
29a to 29d holding sections
30 recessed area
31 insertion section
32 locking section
33 edge
34 through hole
35 symmetry axis
36 through hole
37 bend axis
38 connector
40 set
41a to 41d webs
42 edge
43 tab
A1, A2 distances D distance
d distance
F1, F2 surfaces
L throughflow direction
RO raw side/inflow side
RE clean side/outflow side

The invention claimed is:

1. A filter apparatus for a motor vehicle, comprising:
a filter element having a filter medium body and a frame surrounding the filter medium body, wherein the frame comprises two opposing lateral surfaces;
a plurality of engagement elements; and
a filter housing comprising two opposing wall sections, at least one of the wall sections comprising at least one engagement counter element in which one of the plurality of engagement elements can be accommodated in a positive fitting manner, wherein the at least one engagement counter element defines a groove in the wall section of the filter housing;
wherein the groove comprises an insertion section which permits an insertion movement of the one of the plurality of engagement elements substantially along a throughflow direction and
a locking section extending from the insertion section at an angle with respect to the insertion section;
wherein the one of the plurality of engagement elements is disposed on one of the lateral surfaces of the frame of the filter element and extends away from the filter medium body; and
wherein the one of the lateral surfaces of the frame of the filter element has at least one through opening which, in an assembled state of the filter element in the filter housing, lies opposite the locking section, and wherein, in the assembled state, the one of the plurality of engagement elements engages through the through opening and positively engages in the locking section of the groove of the at least one engagement counter element.

2. The filter apparatus according to claim 1, wherein the at least one engagement counter element of the at least one of the wall sections comprises two engagement counter elements arranged in opposite directions and each defining an L-shaped geometry, wherein the L-shaped geometries are arranged mirror-symmetrically to one another and wherein one leg of the L-shaped geometry corresponds to the insertion section and the other leg of the L-shaped geometry corresponds to the locking section, and wherein the two locking sections of the two engagement counter elements face away from one another and the two insertion sections of the two engagement counter elements are disposed parallel to one another.

3. The filter apparatus according to claim 2, wherein the plurality of engagement elements are attached to the filter element, or are formed integrally therewith, and wherein, in an undeformed state of the filter element, a distance between two of the plurality of engagement elements is greater than a distance between the two insertion sections of the wall section of the filter housing.

4. The filter apparatus according to claim 1, wherein the locking section defines a pocket or through opening in the wall section into which the one of the plurality of engagement elements engages in the assembled state.

5. The filter apparatus according to claim 1, wherein the at least one of the lateral surfaces of the frame of the filter element defines two through openings which, in the assembled state of the filter element in the filter housing, each of the two through openings lies opposite a respective locking section, and wherein, in the assembled state, a respective one of the plurality of engagement elements further engages through each one of the two through openings and engages in the respective locking section.

6. A vehicle comprising the filter apparatus according to claim 1.

7. A use of a set comprising the filter element and the plurality of engagement elements in the filter apparatus according to claim 1, wherein the filter element comprises the filter medium body and the frame surrounding the filter medium body, wherein the frame comprises the two opposing lateral surfaces, and wherein the one of the plurality of engagement elements is adapted to be disposed on one of the two opposing lateral surfaces of the filter element in the assembled state of the filter element in the filter housing, so as to extend away from the filter medium body and to be positively held in the locking section of the filter housing.

8. The use according to claim 7, wherein the one of the plurality of engagement elements is adapted to be inserted into the insertion section of the filter housing substantially along the throughflow direction when the filter element is mounted in the filter housing.

9. A filter apparatus comprising:
a filter element having a filter medium body and a frame surrounding the filter medium body, wherein the frame comprises two opposing lateral surfaces;
a plurality of engagement elements; and
a filter housing comprising two opposing wall sections, at least one of the wall sections comprising at least one engagement counter element in which one of the plurality of engagement elements is configured to be accommodated, wherein the at least one engagement counter element defines a groove in the wall section of the filter housing;
wherein the groove comprises an insertion section which permits an insertion movement of the one of the plurality of engagement elements substantially along a throughflow direction and a locking section extending from the insertion section at an angle with respect to the insertion section; and
wherein the one of the plurality of engagement elements is disposed on one of the lateral surfaces of the frame of the filter element and extends away from the filter medium body;
further comprising a holding sections connected to the one of the plurality of engagement elements and disposed in a recessed area of the filter medium body in an assembled state, and wherein the recessed area of the filter medium body is accessible from a side of the filter element from which the filter element is mounted in the filter housing.

10. The filter apparatus according to claim 9, wherein two of the plurality of engagement elements or the corresponding holding sections are connected using a connector.

11. The filter apparatus according to claim 10, wherein the connector extends parallel or perpendicular to the two opposing lateral surfaces of the frame in the assembled state.

12. The filter apparatus according to claim 10, wherein the two of the plurality of engagement elements are each disposed on a different one of the two opposing lateral surfaces of the frame or are both disposed on one of the two opposing lateral surfaces of the frame and are connected to each other using the connector.

13. The filter apparatus according to claim 10, wherein, in an undeformed state of the filter element, a distance between two of the plurality of engagement elements is greater than a distance between the two insertion sections of the wall section of the filter housing, and wherein the connector is elastically deformable for inserting each of the two of the engagement elements into a respective locking section.

14. The filter apparatus according to claim 10, wherein the connector extends across fold tips of the filter medium body and/or in the recessed area through the filter medium body.

15. A filter apparatus comprising:
- a filter element having a filter element body and a frame surrounding the filter medium body, wherein the frame comprises two opposing lateral surfaces;
- a plurality of engagement elements; and
- a filter housing comprising two opposing wall sections, at least one of the wall sections comprising at least one engagement counter element in which one of the plurality of engagement elements is configured to be accommodated, wherein the at least one engagement counter element defines a groove in the wall section of the filter housing;
- wherein the groove comprises an insertion section which permits an insertion movement of the one of the plurality of engagement elements substantially along a throughflow direction and a locking section extending from the insertion section at an angle with respect to the insertion section; and
- wherein the one of the plurality of engagement elements is disposed on one of the lateral surfaces of the frame of the filter element and extends away from the filter medium body;
- further comprising a holding section connected to the one of the plurality of engagement elements and, in an assembled state, engaging at least partially around or behind the filter element on an inflow side or on an outflow side or on an upstream edge or on a downstream edge of the frame.

16. The filter apparatus according to claim 15, wherein the holding section defines a cross shape and the one of the plurality of engagement elements is disposed at a lower end of the cross shape, wherein the cross shape laterally engages the filter element on the upstream edge or on the downstream edge of the frame, or on the wall section of the filter housing, and wherein an upper end of the cross shape comprises a gripping section for manually mounting the one of the plurality of engagement elements on the filter element or on the filter housing.

17. A method for mounting a filter element in a filter housing using a plurality of engagement elements, wherein the filter element comprises a filter medium body and a frame surrounding the filter medium body, wherein the frame comprises two opposing lateral surfaces, wherein the filter housing comprises two opposing wall sections, at least one of the wall sections comprising at least one engagement counter elements in which one of the plurality of engagement elements is adapted to be accommodated in a positive fitting manner, wherein the engagement counter element is configured as a groove in the wall section of the filter housing and comprises an insertion section which, permits an insertion movement of the engagement element substantially along a throughflow direction, and a locking section connected to the insertion section and angled with respect to the insertion section, and wherein at least one of the lateral surfaces of the frame of the filter element has at least one through opening which, in an assembled state of the filter element in the filter housing, lies opposite the locking section, and wherein, in the assembled state, the one of the plurality of engagement elements engages through the through opening and positively engages in the locking section of the groove of the engagement counter element, wherein the method comprises:
  a) inserting the filter element into the filter housing; and
  b) arranging the engagement element on the lateral surface of the filter element such that the engagement element extends away from the filter medium body and is positively held in the locking section.

18. The method according to claim 17, wherein, before executing the step b), the engagement element is inserted into the insertion section of the filter housing substantially along the throughflow direction.

* * * * *